United States Patent
King et al.

(10) Patent No.: US 12,443,586 B1
(45) Date of Patent: Oct. 14, 2025

(54) GENERATING DATABASE MODIFICATIONS-BASED EVENT PARAMETERS

(71) Applicant: Citibank, N.A., New York, NY (US)

(72) Inventors: Jeffrey King, London (GB); Jonathan Burrows, London (GB); Rebekah Button, London (GB)

(73) Assignee: Citibank, N.A., New York, NY (US)

(*) Notice: Subject to any disclaimer, the term of this patent is extended or adjusted under 35 U.S.C. 154(b) by 0 days.

(21) Appl. No.: 19/047,760

(22) Filed: Feb. 7, 2025

(51) Int. Cl.
*G06F 7/00* (2006.01)
*G06F 16/00* (2019.01)
*G06F 16/23* (2019.01)

(52) U.S. Cl.
CPC .................. *G06F 16/2358* (2019.01)

(58) Field of Classification Search
CPC ...... G06F 16/27; G06F 16/972; G06F 16/288; G06F 16/955; G06F 16/337; G06F 16/22; G06F 16/275
See application file for complete search history.

(56) References Cited

U.S. PATENT DOCUMENTS

| | | | |
|---|---|---|---|
| 2012/0150888 A1* | 6/2012 | Hyatt | G06F 16/9535 707/758 |
| 2020/0204557 A1* | 6/2020 | Singh | H04L 67/306 |
| 2021/0144233 A1* | 5/2021 | Govan | G06Q 50/01 |
| 2023/0013795 A1* | 1/2023 | Mitevski | H04L 63/1441 |
| 2023/0232052 A1* | 7/2023 | Khavronin | H04N 21/251 709/219 |

* cited by examiner

*Primary Examiner* — Tuan A Pham
(74) *Attorney, Agent, or Firm* — Perkins Coie LLP

(57) ABSTRACT

Methods and systems for performing database modifications based on event parameters are disclosed herein. The system may receive a resource event comprising one or more event parameters. The system may determine a set of entities associated with the resource event. The system may validate the resource event using the one or more event parameters. The system may determine a plurality of user accounts associated with the resource event. The system may modify resource distributions for each user account of the plurality of user accounts to generate modified resource distributions. The system may transmit, to a central database, one or more commands to update a central record of the resource distributions.

17 Claims, 7 Drawing Sheets

| Resource Event 202 | |
|---|---|
| Event Identifier 204 | Event A |
| Event Type 206 | Type A |
| Event Parameters 208 | |
| Parameter(s) A 210a | Value(s) 1 |
| Parameter(s) B 210b | Value(s) 2 |
| Parameter(s) C 210c | Value(s) 3 |

| Entities Associated with Event A 302 ||
|---|---|
| Entity Identifier 304 | Domain Identifier 306 |
| Entity A | Domain 1 |
| Entity B | Domain 2 |
| Entity C | Domain 1 |
| Entity D | Domain 3 |
| Entity E | Domain 1 |

FIG. 3

| User Accounts for Event A and Domain 1 402 ||
|---|---|
| Entity Identifier 404 | Account Identifier 406 |
| Entity A | User Account 1 |
| | User Account 8 |
| Entity C | User Account 10 |
| | User Account 3 |
| Entity E | User Account 11 |
| | User Account 15 |

Resource Distribution A 510

| Account Identifier 512 | Resource Identifier 514 | Resource Value 516 |
|---|---|---|
| User Account 1 | Resource 1 | Value 1 |
| User Account 2 | Resource 2 | Value 2a |
| User Account 3 | Resource 1 | Value 3 |
| | Resource 2 | Value 3a |
| | Resource 5 | Value 4 |
| User Account 7 | Resource 1 | Value 5 |

Resource Distribution B 520

| Account Identifier 522 | Resource Identifier 524 | Resource Value 526 |
|---|---|---|
| User Account 1 | Resource 1 | Value 1 |
| | Resource 6a | Value 6a |
| | Resource 6b | Value 6b |
| User Account 2 | Resource 1 | Value 3 |
| User Account 3 | Resource 7a | Value 7a |
| | Resource 7b | Value 7b |
| | Resource 5 | Value 4 |
| User Account 7 | Resource 1 | Value 5 |

FIG. 5

GENERATING DATABASE MODIFICATIONS-BASED EVENT PARAMETERS

BACKGROUND

With the advent of cloud computing, resource allocation has become increasingly important, complex, and vulnerable. Cloud computing systems may include a large number of computing devices that have various combinations of memory, processors, disk space, or other features. Particular components of complex networks may be communicably linked to different entities and/or managed by different devices. For example, different subsets of devices that are linked to a given network may be controlled or administered by different entities. As such, network-level resource allocation in the context of intricate, multifaceted cloud computing-based networks may be difficult and time-consuming due to the distributed nature of such systems, thereby convoluting the validation and execution of resource allocation and data processing tasks.

SUMMARY

Conventional approaches rely on a decentralized, non-automated, entity-dependent allocation of resources within a distributed network, even when such resource allocations are globally configured. For example, in a conventional network of devices that is managed by a set of entities (e.g., a set of administrators assigned to different sections of the network), indications of global changes in resource allocation (e.g., resource events) are forwarded to the affected entities. Subsequently, in conventional systems, validation and execution of the resource allocations are delegated to the entities themselves, thereby leading to redundant validation and configuration operations on each of the underlying devices and respective resources prior to resource reallocation. As such, conventional approaches typically involve linear, message-based communication between a super-administrator responsible for resource allocation and the entities of the distributed network of devices, thereby requiring the entities to implement the associated resource allocation instructions. Conversely, the disclosed system enables dynamic validation and implementation of resource allocation-related events on a global basis, enabling entities to propagate resource allocation changes across multiple devices managed by different entities (e.g., within a particular domain or group of entities), thereby improving the underlying network's ability to manage resources in response to changing conditions or resources.

Methods and systems described herein may perform database modifications based on resource event parameters for devices or accounts that are associated with different entities or domains of entities. For example, the system may receive information characterizing a resource event that is associated with reallocation or redefinition of resources associated with particular user accounts (e.g., a redistribution of cloud computing drive storage allotments), where resources associated with such user accounts are managed by or associated with particular entities. Based on parameters associated with the resource event, the system may determine a set of entities that are affected by the resource event, such as a group of administrator devices responsible for management of associated cloud computing user accounts. In some implementations, the system may categorize the entities into different domains, where the entities within a particular domain are managed by or associated with a corresponding subsystem or administrator system. The system may validate the resource event according to the information characterizing the event (e.g., according to the received resource parameters) and determine a set of user accounts or devices that are affected by or otherwise linked to the resource event. The system may, accordingly, modify resource distributions (e.g., storage allotments) associated with the set of user accounts to implement the associated resource event or reallocation on an entity-related system or database, thereby directly and locally effectuating the requested resource allocation. The system may notify and/or update a central database of the changes by transmitting information characterizing the database modifications that are based on resource-event parameters, such as modified resource distributions, thereby effectuating the change on a global, network-wide level. By doing so, the system enables efficient, non-redundant validation and processing of resource allocation requests or modifications within a distributed network on both local and global scales.

In particular, the system may receive a resource event (e.g., a resource allocation request) including information characterizing a modified resource allocation. For example, the system may receive, at a computing device within a first domain, a resource event that includes one or more event parameters associated with the resource event. The first domain may include a first subset of entities. As an illustrative example, the system may receive an indication of a reallocation of computational resources (e.g., cloud computing storage allotments) for a set of user devices or associated user accounts within a cloud-computing environment, where the indication of the reallocation indicates that particular user accounts are to be assigned additional resources, or where such resources are to be split or partitioned. Receiving such information enables the system to dynamically handle resource allocation requests originating from a global administrator system.

In some implementations, the system may identify a set of entities associated with the resource event. For example, the system may determine, based on the one or more event parameters of the resource event, a set of entities associated with the resource event. The set of entities may include the first subset of entities associated with the first domain, as well as a second subset of entities associated with different domains from the first domain. To illustrate, the system may receive information relating to the resource event that characterizes the nature of the resource allocation event and/or enables the system to determine which accounts or devices are affected by the change in resource distribution. For example, the resource event and associated parameters may include values of account identifiers associated with a doubling of allocated resources. In some implementations, the event parameters include an indication of a type of resource event (e.g., a splitting of resources or a doubling of resources for a particular set of user accounts). Based on the account identifiers, the system may determine a particular set of entities associated with administration (e.g., custody) of the accounts linked to the account identifiers. By doing so, the system enables determination of particular administrator systems that are tasked with resource management for the affected user accounts, thereby enabling the implementation of requested modifications to resource distributions.

In some implementations, the system may validate the resource event using parameters associated with the resource event (e.g., the resource allocation request). For example, the system may validate the resource event using the one or more resource parameters. As an illustrative example, the system may validate that the particular resource allocation request originated from a suitable source, such as an authenticated administrator device. The system may authenticate or validate security features of the resource event or associated parameters to determine whether the resource event is valid (e.g., via multi-factor authentication). By doing so, the system may ensure the safety and security of resource redistribution within the associated system of user accounts and entities.

In some implementations, the system may identify user accounts associated with the resource event and categorize such user accounts based on their respective entities. For example, the system may determine, for the first subset of entities, a plurality of user accounts associated with the resource event where the user accounts are assigned to different entities (e.g., administrator systems) within the first domain. As an illustrative example, the system may categorize user accounts associated with the resource event based on whether they are managed by a particular group or set of administrator devices (e.g., accounts managed by entities that are associated with the same super-administrator and/or are of a common type of administrator device). In some implementations, the system excludes user accounts that are managed by entities of other domains (e.g., other than entities of the first domain). By doing so, the system may process the resource event according to a type or group associated with managing entities of the affected user accounts, thereby enabling more efficient resource distribution and reallocation across a variety of related entities. Thus, the system may improve the efficiency of resource distribution modifications by grouping related entities and processing resource events associated with such entities in a consolidated manner.

In some implementations, the system may modify resource distributions associated with each affected user account. For example, the system may modify, based on the one or more event parameters of the resource event, resource distributions for each user account within a plurality of user accounts to generate modified resource distributions. As an illustrative example, the system may modify a database or other set of records associated with particular user accounts managed by entities of the first domain to implement the requested resource reallocation (e.g., as defined by the event parameters associated with the resource event). The system may assign additional resources to particular users that are managed by a given entity by modifying an entity-specific database record associated with the particular users' user accounts, where the additional resources are allocated according to parameters associated with the resource event. For example, the system may generate one or more updated values of a resource size assigned to one or more respective users and replace the original resource size values within the respective records. By doing so, the system may directly modify resource distributions across user accounts managed by various entities (e.g., various different administrators) with a single validation step, reducing the redundancy inherent in modifying resources associated with distributed networks in conventional systems.

In some implementations, the system may transmit commands to update the resource distributions within a central database (e.g., in communication with, interlinked with, or otherwise associated with the distributed network). For example, the system may transmit, to a central database, one or more commands to update the resource distributions, where the one or more commands include one or more indications of the modified resource distributions. The central database may be accessible from the first domain and the different domains. As an illustrative example, the system may transmit a command to update a database that tracks resource allocations associated with user accounts across multiple entities (e.g., across various domains). The system may transmit information relating to which user accounts were affected by the resource event (e.g., user accounts whose resource distributions were modified), as needed, may further transmit an identifier of, or other information identifying, the associated entity responsible for managing the particular user accounts. Based on such information, and in some instances in response to receiving such information, the system may modify the central database to reflect the updated user accounts' resource allocations, thereby effectuating the resource event on a global basis.

In some embodiments, the system may identify and instruct entities associated with different domains (e.g., not associated with the first domain) to modify resource distributions according to the parameters of the resource event. For example, the system may identify, based on the one or more event parameters, a plurality of domains and associated resource distributions for the second subset of entities that are associated with the different domains. The system may determine, for each domain of the plurality of domains, a corresponding distribution of resources. The system may generate a message that instructs each domain to modify corresponding database records for corresponding user accounts within each domain based on the associated resource distributions. As an illustrative example, the system may identify user accounts that are indicated within the parameters of the resource event, where the identified user accounts are managed by administrator devices that are different from those associated with the first domain. The system may generate a message to be transmitted to these different administrator devices that instructs each of the domain associated with devices to redistribute resources (e.g., modify corresponding database records) according to the requirements of the resource event. By doing so, the system may handle situations where administrator devices do not allow for direct modification of resource allocation and, as a result, require notification of modification (e.g., via a message) prior to internal or independent validation and processing of the change in resource distribution. As such, the disclosed system enables efficient, entity-specific processing of resource reallocation requests by reducing redundant validation steps and by categorizing entities and associated user accounts by domain and associated permissions.

BRIEF DESCRIPTION OF THE DRAWINGS

FIG. 2 illustrates an excerpt of a data structure representing a resource event, in accordance with one or more embodiments of this disclosure.

FIG. 3 illustrates an excerpt of a data structure representing a list of entities associated with a resource event, in accordance with one or more embodiments of this disclosure.

FIG. 4 illustrates an excerpt of a data structure storing user account data associated with entities, in accordance with one or more embodiments of this disclosure.

FIG. 5 illustrates an excerpt of data structures storing resource distributions, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to cloud computing and/or financial resource management.

Figure 1:
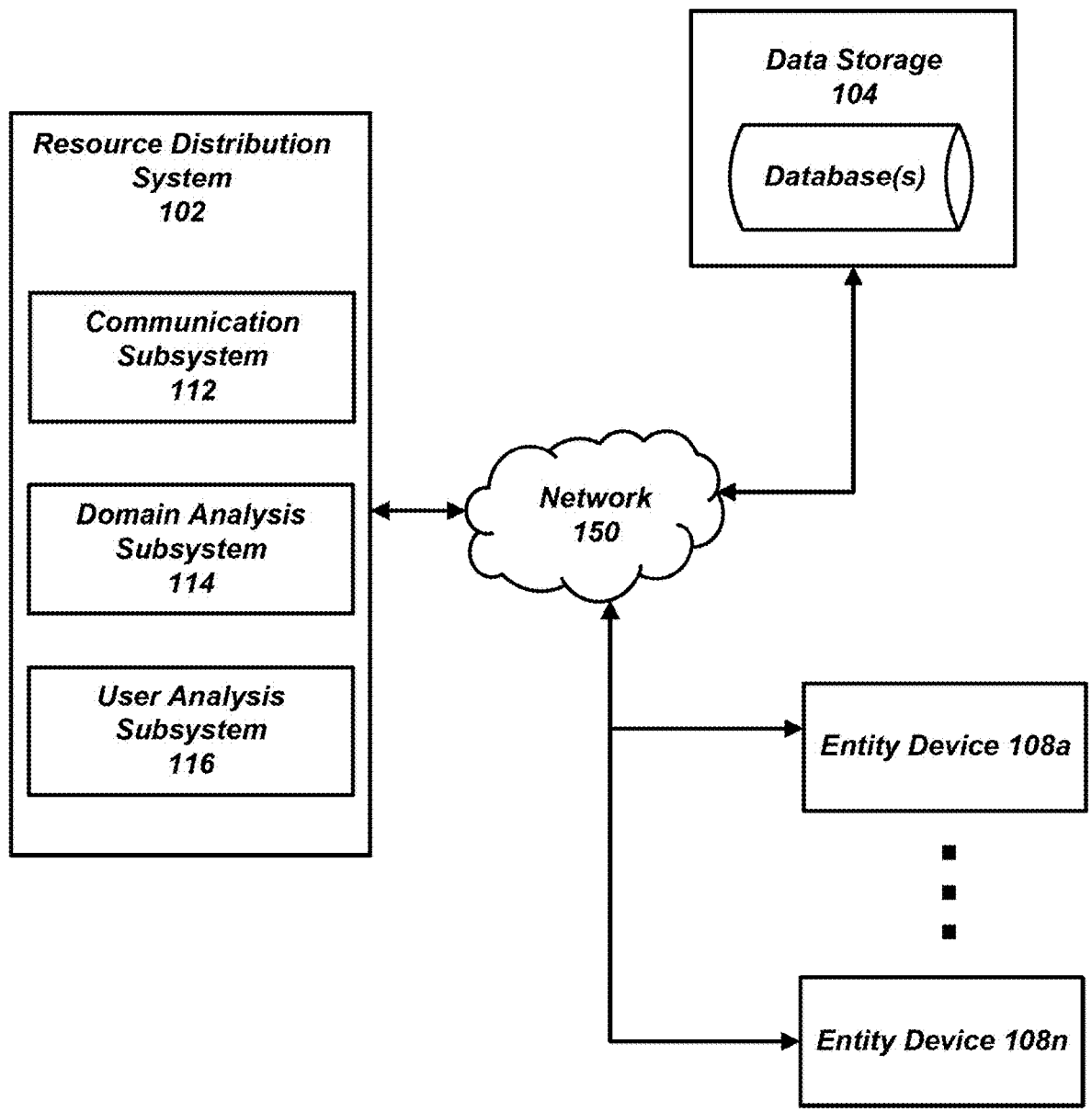
FIG. 1 shows an illustrative system for performing database modifications based on event parameters, in accordance with one or more embodiments of this disclosure.

FIG. 1 shows an illustrative system for performing database modifications based on event parameters, in accordance with one or more embodiments of this disclosure. Environment 100 includes resource allocation system 102, data storage 104, and entity devices 108a-108n. Resource allocation system 102 may execute instructions for processing resource events to generate modified resource distributions and may include software components, hardware components, or a combination of software and hardware components. For example, resource allocation system 102 may be hosted on a physical server or a virtual server that is running on a physical computer system. In some embodiments, resource allocation system 102 may be configured on a user device (e.g., a laptop computer, a smartphone, a desktop computer, an electronic tablet, or another suitable user device). Devices and/or systems associated with resource allocation system 102 may communicate with other devices and/or systems, such as data storage 104 and/or entity devices 108a-108n (e.g., via network 150), as described in detail below.

Resource allocation system 102 may be associated with and/or communicably linked with one or more entities (e.g., via associated entity devices). For example, components associated with resource allocation system 102 may be configured on hardware and/or software associated with a first entity and/or set of entities. Additionally or alternatively, components associated with resource allocation system 102 may be communicably linked to devices associated with entities (e.g., one or more of entity devices 108a-108n), such as via network 150. In some implementations, each entity device (e.g., of one or more entity devices 108a-108n) is controlled by a respective entity (e.g., associated with a respective entity identifier).

Attempting to create a system to dynamically validate and execute resource allocation operations in distributed networks in view of the available conventional approaches created significant technological uncertainty. Creating such a system required addressing several unknowns in conventional approaches relating to processing resource allocation events or operations, including how to execute operations that depend on the relationships between subsystems (e.g., user accounts linked to or with ownership of financial assets) within the associated network (e.g., within a bank or banking system), as well as on the associated administrator entities (e.g., the custodians responsible for management and administration of user-owned assets). Similarly, conventional approaches for implementing resource allocation (e.g., administration of financial assets) did not provide methods for managing resource allocation operations in an automated, scalable manner, as such conventional methods relied on manual validation and execution of resource allocation changes (e.g., asset servicing events) by entities associated with the suitable devices/accounts affected by the particular resource allocation event, such as by the sub-custodians responsible for the management of the users' assets.

Conventional approaches rely on a decentralized, non-automated, sub-custodian-dependent allocation of resources within a financial asset distribution system, even when such assets are globally configured or administered. For example, in conventional systems managed by a set of custodians (e.g., a set of banks to which different user accounts are assigned), indications of global changes in resource allocations are forwarded to affected custodians, requiring both global and direct processing of any resource redistributions (e.g., share-splitting or election events). As such, in conventional systems, validation and execution of the resource allocations are delegated to the custodians themselves, leading to redundant validation and configuration operations.

Additionally, the occurrence of different resource allocation events (e.g., asset servicing events) within a distributed network of sub-custodians or custodians created further uncertainty, since the legacy system may benefit from different validation techniques or resource allocation protocols depending on the nature of the event and the affected banks or banking groups, for example. In conventional systems, different types of resource allocation events are handled manually on an entity-by-entity (e.g., sub-custodian-by-sub-custodian) basis, where a given entity associated with managing particular devices or accounts implements a given resource allocation operation according to the type of resource allocation operation required (e.g., by the type of asset servicing event received). For example, when resources are to be doubled, split, or added according to the particular resource allocation event consistent with a share-split event, a conventional system generates a message characterizing such an operation, which is then processed independently by different entities (e.g., banks) according to the type of resource allocation event. To successfully implement legacy resource distribution systems within distributed networks that are managed by different entities, the system should validate and implement different types of resource allocation events in a suitable manner that is uniform across the different entities' devices or accounts.

To overcome these technological uncertainties, the inventors systematically evaluated multiple design alternatives. For example, the inventors experimented with validation of resource allocation events at both global and direct entity-specific levels to handle entity-specific features or security breaches. However, the use of global and direct event validation proved to be insufficient, leading to significant latencies in asset management and handling. Similarly, the inventors experimented with using a central database to track resource allocation assignments associated with different entities within the network. While the central database was capable of managing entity-specific resource allocation data, such a system on its own could effectively validate and implement the resource allocations on the associated entities' devices or accounts, leading to ineffective handling of resource allocation events. Thus, the inventors experimented with different methods for validating and executing resource allocation operations to identify the most efficient and effective approaches. Additionally, the inventors systematically evaluated different strategies for handling different resource allocation event types and propagating device-related changes across all suitable entities without relying on entity-supervised resource reallocation. The inventors evaluated, for example, different methods of validating and processing resource allocation-related events both globally and directly (e.g., as associated with particular entities or groups of entities) by combining global and direct implementation tasks, while leveraging the concept of a central database storing resource allocation information. As such, the inventors accounted for and reduced redundancies in entity-specific resource allocation event processing, thereby improving the efficiency and accuracy of resource allocation.

An entity may include one or more administrator systems, custodians, and/or associated devices. For example, an entity may include a financial institution (e.g., a sub-custodian, such as a bank), a cloud computing service (e.g., a cloud computing management service), and/or another administrator of electronic or financial resources. For example, an entity may be responsible for managing resource distributions for a set of users (e.g., associated with respective user accounts). For example, the resource allocation system 102 may reside in one or more devices administered by a particular entity. Additionally or alternatively, the resource allocation system 102 may be distributed across a set of devices and/or servers (e.g., associated with the same entity and/or different entities). To illustrate, an entity may include a particular banking institution or another sub-custodian (e.g., associated with a particular country or geographical region). The entity may be associated with an entity identifier, such as an entity name (e.g., a corporation name) and/or another unique identifier of the entity (e.g., a bank identification code, a Society for Worldwide Interbank Financial Telecommunication (SWIFT) code, or another suitable identifier). Additionally or alternatively, an entity identifier may include a device identifier, network identifier, and/or other suitable unique identifiers. In some implementations, an entity may include a particular device and/or set of devices managed by or communicably linked to a particular entity (e.g., a cloud storage provider within a cloud storage/data storage system, or an associated administrator).

In some implementations, components of the resource allocation system 102 may reside on different devices associated with different entities associated with the same domain (e.g., custodian/super-custodian). A domain may include a set of entities that are associated with one another (e.g., with defined relationships). For example, devices of a domain may be communicably linked to each other and/or are connected to a common network. For example, a domain includes a representation of a banking group or a similar group of financial institutions that are related to each other. For example, a domain includes an indication or definition of a set of financial institutions (e.g., as identified via an entity identifier) that are associated with a common organizational structure or hierarchy. In some implementations, a domain may include a set of devices and/or a set of entities with relaxed or different communication controls or access controls with respect to each other or data within a database. For example, in some implementations, entities associated with a domain may access (e.g., via suitable devices) particular databases associated with one or more domain-specific data nodes, such as data storage 104. Additionally or alternatively, entities associated with one or more domains may access data associated with a central database (e.g., that is accessible to entities of more than one domain).

Data storage 104 may store various data, including user account data, resource distribution data, event parameters, resource events, and/or messages/transmissions associated with resource reallocation events, and/or other suitable data. Data storage 104 may include software components, hardware components, or a combination of software and hardware components. For example, the data storage 104 may be a physical server or a virtual server that is running on a physical computer system. In some embodiments, resource allocation system 102 and data storage 104 may reside on the same hardware and/or the same virtual server/computing device.

Data storage 104 may include databases that are managed by a particular entity and/or set of entities and/or domain. For example, a database within data storage 104 is accessible to a subset of the entity devices 108a-108n (e.g., a set of entity devices associated with the same entity, and/or a set of entity devices associated with entities of the same domain). To illustrate, a database within the data storage 104 may include access controls and/or other restrictions limiting access and/or modification of underlying data by devices not associated with a particular list of entities and/or particular domains. For example, a database may include information (e.g., digitally stored records) relating to user accounts managed by a particular entity or domain of entities (e.g., and/or associated resource distributions, as described below).

Additionally or alternatively, a database (e.g., associated with data storage 104) may be accessible to one or more entity devices 108a-108n regardless of the nature/identity of the associated entity and/or domain. For example, a central database stored in data storage 104 may include data that is accessible from devices associated with more than one domain. The central database may include information of a central security deposit (CSD) that is accessible to devices associated with one or more entities of one or more domains. In some implementations, environment 100 may include more than one data storage 104 (e.g., associated with more than one data storage node). For example, environment 100 may include a first data storage node that is accessible to a subset of particular entities or entity devices (e.g., as associated with a particular domain) and may include a second data storage node that is accessible to a wider set of entities or entity devices (e.g., as associated with more than one domain). For example, a central database may be accessible via the second data storage node, while a local database may be accessible via the first data storage node.

Resource allocation system 102 may access data storage 104 and/or other nodes or components via network 150. Network 150 may be a local area network (LAN), a wide area network (WAN) (e.g., the Internet), or a combination of the two. Entity devices 108a-108n may be end-user computing devices (e.g., desktop computers, laptops, electronic tablets, smartphones, and/or other computing devices used by end users) that may include microphone(s) and/or other suitable components. In some embodiments, end-user devices may include devices used to manage financial or other electronic resources associated with banks, such as shares, digital currency stores, and/or other suitable data or resources.

Resource allocation system 102 may perform operations relating to modifications of resource distributions, such as distributions of shares associated with different user accounts of a banking institution and/or banking group, based on received communications or notifications associated with changes in resource distributions. Resource allocation system 102 may receive resource events or other suitable transmissions or messages using communication subsystem 112 (e.g., of FIG. 1). Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the resource event and/or other suitable data from one or more entity devices 108a-108n, data storage 104, and/or another suitable computing device.

In some embodiments, resource allocation system 102 (e.g., via communication subsystem 112) may receive an announcement- or payment-type resource event (e.g., from a market interface, originator device, or database associated with data storage 104, such as a central database or central securities depository). The communication subsystem 112, in response to receiving the announcement- or payment-type resource event, may transmit instructions, commands, and/or messages to one or more suitable entities and/or entity devices (e.g., associated with one or more domains), as described below. Additionally or alternatively, resource allocation system 102 (e.g., via communication subsystem 112) may receive an indication of one or more instructions (e.g., an election) from one or more entities or entity devices (e.g., associated with one or more domains). The resource allocation system 102 may transmit an indication of the one or more instruction to a market interface, originator device, or database associated with data storage 104, such as a central securities depository or central database. As such, communication subsystem 112 enables management of bidirectional communications between various entities, devices, or databases associated with environment 100.

Resource allocation system 102, via communication subsystem 112, may receive information characterizing a resource event. For example, the system may receive, at a computing device within a first domain, a resource event. The resource event may include one or more event parameters associated with the resource event. The first domain may include a first subset of entities. In some embodiments, the resource event includes information characterizing a change in resource distributions associated with user accounts (e.g., associated with reallocation or redefinition of resources associated with particular user accounts). For example, the system may receive notification of a split in shares for user accounts for users who own shares in a particular company. In some embodiments, resource allocation system 102 may receive a resource event from a device associated with a central or global database (e.g., as associated with data storage 104, such as a central securities depository). Additionally or alternatively, resource allocation system 102 may receive a resource event from an entity device (e.g., as associated with a particular bank) or originator device (e.g., as associated with an issuer of securities). As such, resource allocation system 102 enables the handling of redistributions of resources or other resource events, such as financial resources and/or other electronic resources (e.g., cloud computing resources) upon receipt of information characterizing such redistributions.

A resource (e.g., affected by a resource event) may include an asset, instrument, security, or another asset associated with and/or owned by one or more users, entities, and/or institutions. For example, a resource includes securities (e.g., equity securities, such as stocks), debt securities (e.g., bonds), derivatives (e.g., options, futures, and swaps), mutual funds/exchange-traded funds (ETFs), real-estate investment trusts, commodities, computational resources (e.g., memory space, storage space, processor allocations, and/or other suitable resources), and/or other suitable assets. For example, resources may be characterized by type (e.g., asset type), issuer (e.g., an originator), ownership, valuation (e.g., a quantity associated with a value of the asset), liquidity, and/or risk. Entities may manage the distribution (e.g., the ownership) of resources (e.g., when issued to users and/or modified). For example, entities (e.g., banks) may manage databases associated with user accounts that specify ownership of assets by respective users, as described in relation to FIG. 5 below.

A resource may originate from and/or be issued by an originator (e.g., an issuer). For example, an originator may include a company, entity, institution, and/or device associated with the origination of a resource. An originator may include an entity responsible for creating, registering, distributing, and/or issuing resources (e.g., financial instruments or other assets). For example, an originator includes an issuer of shares or bonds. An originator may be associated with an originator identifier (e.g., a name and/or an alphanumeric indicator).

FIG. 2 illustrates an excerpt of data structure 200 representing resource event 202, in accordance with one or more embodiments of this disclosure. For example, resource event 202 includes event identifier 204 and/or other information characterizing the event, such as event type 206. In some embodiments, resource event 202 includes data structure 208 including event parameters 210a-210c. Resource event 202 may be associated with occurrences or actions affecting the ownership, value, or rights associated with particular assets or resources (e.g., shares). For example, a resource event may include an action that triggers a series of processes and/or communications associated with the management and administration of resources (e.g., financial assets and/or electronic assets). The resource event may include an identifier (e.g., a unique serial number or identifier of a particular event) and may be classified into a particular type. For example, event type 206 may include an indication that resource event 202 is an announcement, an entitlements reconciliation, an election, a payment, and/or another suitable event.

For example, an announcement-type resource event includes a formal notification issued by issuers (e.g., originators) and/or regulatory bodies regarding changes or actions associated with a security (e.g., a resource). In some implementations, an announcement-type resource event includes a stock split (e.g., a 2-for-1 stock split), in which each share or asset assigned to a particular user/shareholder is split (e.g., according to a defined ratio). In some implementations, event type 206 includes an indication of a stock-split or another suitable description of the event.

An entitlements reconciliation- or payment-type resource event may include verifying and/or updating allocations of resources to users. For example, a payment-type resource event may include disbursement of dividend payments from an issuer (e.g., an originator) users associated with user accounts according to the users' entitlement to such payments (e.g., according to a number of stocks owned by the respective users).

An election-type resource event may include enabling a user associated with particular resources to modify and/or choose particular actions (e.g., as associated with an originator/issuer). For example, an election-type resource event may include transmitting a notification of an option to users to receive dividends in cash or stock (e.g., based on previously owned entitlements) and/or an election to acquire further resources (e.g., shares).

Resource event 202 may include one or more event parameters (e.g., parameters 210a-210c). An event parameter may include information, data, and/or values characterizing a particular resource event. In some implementations, an event parameter may include a list of users (e.g., user account identifiers and/or user accounts) associated with (e.g., affected by) the resource event. For example, an event parameter may include an originator parameter (e.g., an originator identifier associated with the issuer of resources affected by the resource event). In some implementations, the event parameter may include a date and/or timestamp, a deadline parameter (e.g., as associated with an election), a ratio parameter (e.g., as associated with a stock split), and/or another suitable parameter. In some implementations, the resource event parameters (e.g., one or more of parameters 210a-210c) includes a list of users and/or user accounts associated with the resource event (e.g., a list of user account identifiers to which the resource event applies). In some implementations, parameters 210a-210c includes a list of entities and/or entity identifiers to which the resource event applies. The parameters may include one or more messages (e.g., in an alphanumeric and/or textual format) for transmission to affected users. In some implementations, one or more parameters include an indication of pre-determined settings associated with the resource event, such as an indication of default elections for users that do not respond to an election-type resource event by the specified deadline parameter. By receiving such information, resource allocation system 102 may handle resource events according to requirements, characteristics, and/or conditions particular to the particular events and/or affected entities.

When the resource event and associated parameters are received, communication subsystem 112 may pass associated information (e.g., event parameters, such as lists of entity identifiers and/or an originator parameter) to domain analysis subsystem 114. Domain analysis subsystem 114 may include software components, hardware components, or a combination of both. For example, domain analysis subsystem 114 may include software components that access one or more databases (e.g., on data storage 104) to retrieve information relating to entities, domains, and/or users (e.g., associated with resource events). Accordingly, domain analysis subsystem 114 may determine a set of entities associated with a resource event (e.g., based on the one or more event parameters of the resource event). For example, domain analysis subsystem 114 may determine, based on the one or more event parameters of the resource event, a set of entities associated with the resource event. The set of entities may include the first subset of entities within the first domain and a second subset of entities within a set of different domains different from the first domain. As an illustrative example, resource allocation system 102, via domain analysis subsystem 114, may determine a set of financial institutions (e.g., sub-custodians) that administrate resources corresponding to the resource event (e.g., a stock split or an election event). For example, domain analysis subsystem 114 may determine an issuer associated with the assets of the resource event based on an originator parameter of the resource event. Based on identification of the issuer, the domain analysis subsystem 114 may query one or more databases (e.g., as stored in data storage 104) to determine a list of entities that manage assets originating from the identified issuer (e.g., include user accounts for users that own resources associated with the identified originator). In some implementations, domain analysis subsystem 114 classifies such entities (e.g., sub-custodians, such as banking institutions) with respect to their associated domains (e.g., global custodians, such as banking groups). For example, domain analysis subsystem 114 determines subsets of the list of entities that are associated with respective domains. For example, domain analysis subsystem 114 determines a first subset of entities (e.g., sub-custodians) under a first global custodian (e.g., a particular banking group) and a second subset of entities (e.g., sub-custodians) that are not under the first global custodian. By doing so, domain analysis subsystem 114 may handle resource events while accounting for controls or administrative/regulatory barriers associated with communications or processes affecting different domains or entities.

In some implementations, resource allocation system 102, via domain analysis subsystem 114, may determine a set of entities that manage resources associated with a particular originator. For example, resource allocation system 102 may retrieve, from a central database using an originator parameter of the one or more event parameters, a plurality of entities that manage resources for an originator. The system may determine, based on the plurality of entities and the one or more event parameters, the set of entities. Each database entry within the central database may be tagged with an originator identifier associated with the originator. To illustrate, resource allocation system 102 may transmit a request to a central database, such a central security deposit, for a list of banks that manage assets issued by a particular issuer (e.g., associated with an originator parameter of the resource event). Resource allocation system 102, via communication subsystem 112, may receive a data structure including indications of a set of entities associated with the issuer. By receiving such data, resource allocation system 102 enables handling of resource events in an entity-specific (e.g., bank-specific) manner. As such, resource allocation system 102 may flexibly manage assets administered by different sub-custodians and custodians when such sub-custodians or custodians have differing controls (e.g., security protocols) or other characteristics.

In some implementations, resource allocation system 102 (e.g., via domain analysis subsystem 114) may determine entities associated with a particular domain and associated with the resource event based on retrieving entity identifiers from a database associated with one or more particular domains. For example, resource allocation system 102 may retrieve a corresponding entity identifier associated with each entity within the set of entities. Resource allocation system 102 may compare each corresponding entity identifier with entity identifiers within an entity list associated with the first domain. Resource allocation system 102 may determine the first subset of entities based on any matching entity identifiers within the entity list associated with the first domain. For example, resource allocation system 102 may determine entities (e.g., sub-custodians) managed by the same domain (e.g., global custodian) by retrieving an entity list that includes entities specific to a particular domain (e.g., banks within a specific banking group). Domain analysis subsystem 114 may compare the entities of the retrieved entity list with the entities within the set of entities to determine entities affected by the resource event that are specific to the particular domain (e.g., the specified banking group). By doing so, resource allocation system 102 enables domain-specific (e.g., custodian-specific) handling of resource events.

FIG. 3 illustrates an excerpt of a data structure 300 representing a list of entities 302 associated with a resource event, in accordance with one or more embodiments of this disclosure. For example, data structure 300 includes an indication of a set of entity identifiers 304 associated with a particular resource event (e.g., associated with a particular event identifier). For example, set of entity identifiers 304 may include a set of alphanumeric indicators and/or names of banks or other sub-custodians that are responsible for the management of resources originating from an originator (e.g., as defined within event parameters of the resource event). In some implementations, resource allocation system 102, via domain analysis subsystem 114, may determine a set of domain identifiers 306 corresponding to the set of entities, where such domain identifiers identify custodians (e.g., banking groups) associated with the identified entities. As such, resource allocation system 102 enables flexible, custodian-dependent handling of resource events, taking into account differences in event handling protocols among different sub-custodians or custodians (e.g., entities or domains).

In some implementations, resource allocation system 102 (e.g., via domain analysis subsystem 114) may validate the resource event using the one or more event parameters. As an illustrative example, resource allocation system 102 may transmit a multi-factor authentication request to a device issuing the resource event. Resource allocation system 102 may, via communication subsystem 112, receive a token and/or an indication that the multi-factor authentication is satisfied. In some implementations, validation may include verifying a digital signature associated with the resource event. For example, resource allocation system 102 may retrieve a public key associated with a sender of the resource event (e.g., based on an originator parameter or another suitable parameter of the resource event) that is stored in a database associated with data storage 104. Resource allocation system 102 may decrypt a digital signature received from the sender using the public key and apply a hash function to the received resource event to generate a hash value. Resource allocation system 102 may compare the applied hash function with the decrypted digital signature with the generated hash value to validate the resource event. In some implementations, resource allocation system 102 (e.g., via domain analysis subsystem 114) validates the resource event only when the resource event is associated with a particular domain and/or entity.

In some implementations, resource allocation system 102 may determine a set of user accounts associated with the resource event. By doing so, resource allocation system 102 may effectively apply the changes and/or requirements of the resource event to users affected by the resource event, where such users are managed by a particular custodian or set of sub-custodians (e.g., as associated with a particular domain). As such, resource allocation system 102 may provide the set of entities and/or parameters associated with the resource event to user analysis subsystem 116. User analysis subsystem 116 may include software components, hardware components, or a combination of both. For example, user analysis subsystem 116 may include software components that access one or more memory locations (e.g., associated with databases corresponding to suitable entities) to determine user accounts affected by the resource event.

Accordingly, user analysis subsystem 116 may determine a set of user accounts that are associated with the resource event. For example, user analysis subsystem 116 may determine, for the first subset of entities, a plurality of user accounts associated with the resource event. Each user account of the plurality of user accounts may be assigned to a different entity within the first domain. As an illustrative example, user analysis subsystem 116 may access a database (e.g., data storage 104) specific to and/or associated with the first domain to which the first subset of entities correspond. For example, the database may be accessible only to devices or users associated with the first domain. User analysis subsystem 116 may retrieve user account data from the database; the user account data may include identifiers of a set of user accounts that are associated with the particular resource event, such as accounts corresponding to users that own assets affected by the resource event (e.g., assets issued by a corresponding originator identifier). The identifiers may include names, account identifiers (e.g., sort codes and/or account numbers, and/or other alphanumeric identifiers), or other suitable unique identifiers of accounts. By retrieving such information, resource allocation system 102 enables distribution and/or redistribution of resources (e.g., assets) in a manner that is consistent with received resource events.

FIG. 4 illustrates an excerpt of a data structure 400 storing user account data 402 associated with entities, in accordance with one or more embodiments of this disclosure. For example, user account data 402 includes a set of account identifiers 406. In some implementations, the user account data 402 includes entity identifiers 404 that identify the entities responsible for administration of resources associated with the corresponding user account. In some embodiments, user account data 402 includes information relating to user accounts managed by a particular set of entities corresponding to a single domain (e.g., sub-custodians managed by a particular custodian). As an illustrative example, user account data 402 includes data associated with user accounts that are affected by Event A and are managed by entities (e.g., banks) associated with Domain 1.

A user account may include a digital or electronic account used by an individual (e.g., a user) and/or an associated entity to access and/or manage resources, such as financial assets and/or related services. A user account may be accessible via multi-factor authentication and/or login credentials (including a password and/or a username). The user account may be associated with account information, including personal details (e.g., a name, address, contact information, and/or identifiers/identification details). An account identifier for a user account may include a name and/or an alphanumeric identifier of a particular user. The user account may be associated with financial information (e.g., associated with the user's assets and/or resources, such as account balances, transaction histories, and/or holdings). For example, a user account may include information relating to shares, bonds, and/or other securities associated with a particular user. A user account may be administered by a sub-custodian (e.g., a bank/entity) and/or a custodian (e.g., a banking group and/or an associated domain). By identifying user accounts associated with a particular resource event and that are managed by a particular domain, resource allocation system 102 enables domain-specific (e.g., banking group-specific) handling of resource events.

In some embodiments, resource allocation system 102 (e.g., via user analysis subsystem 116) may apply changes specified within the resource event to the affected user accounts. For example, user analysis subsystem 116 may modify, based on the one or more event parameters associated with the resource event, resource distributions for each user account of the plurality of user accounts to generate modified resource distributions. As an illustrative example, resource allocation system 102 may modify the number of shares associated with user accounts affected by the resource event (e.g., a share-split-type event) and/or the valuations associated with the shares. By doing so, resource allocation system 102 may effectively and efficiently process events associated with asset management, thereby effectuating changes defined within the associated resource event.

FIG. 5 illustrates an excerpt of data structures 500 storing resource distributions 510 and 520, in accordance with one or more embodiments of this disclosure. Resource distribution 510 may include a first distribution of resources associated with a set of user accounts. For example, Resource Distribution A (e.g., resource distribution 510) may include an indication of account identifiers 512 and associated resource identifiers 514. Each resource identifier may be associated with a corresponding value of resource values 516. A resource event (e.g., resource event 202 of FIG. 2) may request a modification in resource distributions. Resource Distribution B (e.g., resource distribution 520) may include an indication of account identifiers 522 and associated resource identifiers 524. Each resource identifier may be associated with a corresponding value of resource values 526. In response to the resource event, resource allocation system 102 may cause an update to the resource distribution in a manner that is consistent with the resource event.

A resource distribution (e.g., a resource allocation) may include an indication of assignments, allocations, or ownership of particular resources (e.g., financial assets, such as stocks, bonds, and/or other securities). The resource distribution may be associated with accounts of a particular entity (e.g., a particular bank) and/or a particular domain (e.g., a particular banking group). A resource distribution may include a data structure (e.g., one of data structures 500) that indicates a number (e.g., a quantity) of resources (e.g., assets), a resource type (e.g., a security/asset type), an originator identifier (e.g., an ownership/issuer identifier associated with the resource), and/or other suitable information characterizing the ownership and/or distribution of resources across user accounts. For example, each resource identified by resource identifiers 514 includes a resource value (e.g., of resource values 516) identifying a value associated with the resource. The resource value may include an indication of a financial or monetary value of the resource. In some implementations, a resource value includes a percentage and/or fraction (e.g., of a stock and/or other security, or of ownership of a company). In some implementations, a resource value includes a value of computational resources (e.g., a memory usage value, a central processing unit usage value, or an available storage space value). By recording or setting resource values of resources associated with user accounts, resource allocation system 102 enables execution of resource distribution modifications (e.g., associated with asset servicing events), including stock splits, elections, or other suitable redistribution schemes.

In some embodiments, data structures corresponding to resource distributions are associated with particular entities or domains. For example, in some implementations, resource distributions are stored on data storage 104 that corresponds to (e.g., is accessible by or communicably linked to) one or more particular entity devices of entity devices 108a-108n of FIG. 1. As such, resource allocation system 102, via communication subsystem 112 and network 150, may generate data structures representing the modified resource distributions and modify a database specific to an entity or a domain (e.g., specific to a particular bank or banking system), such as by transmitting a command to a domain-specific or entity-specific database management node (e.g., associated with data storage 104). For example, resource allocation system 102 generates a modified distribution of shares or securities for user accounts associated with the same domain (e.g., the same banking group) and modifies a domain-specific (e.g., a banking group-specific) database, via network 150, to reflect the updated distribution. Additionally or alternatively, resource allocation system 102 generates a modified distribution of shares or securities for user accounts that are managed by different entities within the same domain and transmits commands to devices corresponding to the different entities within the same domain to update local, entity-specific databases associated with the resource event. By doing so, resource allocation system 102 may efficiently manage resources and react to asset servicing events in a non-redundant way, by updating all available databases in a uniform, consistent manner.

Additionally or alternatively, data structures corresponding to resource distributions are accessible to a plurality of entities (e.g., associated with more than one domain). For example, resource distributions are associated with a central database (e.g., stored on data storage 104 that is accessible to a variety of entity devices of various domains, with relatively few restrictions). As such, in some embodiments, resource allocation system 102 may transmit commands to another device (e.g., associated with data storage 104) to update a central record of the resource distributions according to the resource event. For example, resource allocation system 102 may transmit, to a central database, one or more commands to update a central record of the resource distributions. The one or more commands may include one or more indications of the modified resource distributions. The central database may be accessible from the first domain and from the different domains. As an illustrative example, resource allocation system 102 may transmit commands to data storage 104 to update a central database (e.g., that is accessible by various entity devices 108a-108n associated with different domains), such as a Central Security Deposit, so as to execute or apply modifications to resource distributions associated with the resource event. By doing so, resource allocation system 102 may update a central repository such that other entities and/or issuers (e.g., originators) have information relating to the distribution of resources (e.g., securities or other assets) to improve validation procedures and to ensure consistency in resource distributions across various systems (e.g., domains, entities, and/or associated financial institutions, such as banks or banking systems respectively).

Additionally or alternatively, resource allocation system 102, via communication subsystem 112, may generate a message that instructs a set of domains to modify database records that are specific to and/or accessible to the respective domains or entities thereof. For example, resource allocation system 102 may identify, for the second subset of entities of the set of different domains and based on the one or more event parameters, a plurality of domains and associated resource distributions. Resource allocation system 102 may determine, for each domain of the plurality of domains, a corresponding distribution of resources. Resource allocation system 102 may generate, for each domain of the plurality of domains, a message that instructs each domain to modify corresponding database records for corresponding user accounts within each domain based on the associated resource distributions. As an illustrative example, resource allocation system 102 may generate a command or message for transmission to entity devices (e.g., of entity devices 108a-108n) that includes modified resource distributions (and/or a command to modify the resource distributions according to the resource event. For example, the message includes an identification of an issuer (e.g., originator identifier), an event type (e.g., for a share-split event), and/or a list of user accounts affected by the resource event. By generating a message for transmission to other entities, resource allocation system 102 enables cross-domain communication to enable validation and execution of resource events, such as asset servicing events, across a variety of systems managed by different entities (e.g., banks) or different domains (e.g., different domains), improving the flexibility and universal nature of asset servicing.

For example, in some embodiments, resource allocation system 102 may transmit instructions to a computing device (e.g., associated with a particular entity, such as a bank) to update a quantity of resources associated with particular user accounts (e.g., that are managed by the particular entity). For example, resource allocation system 102 may select a first user account of the plurality of user accounts. Resource allocation system 102 may determine (e.g., via user analysis subsystem 116) a first entity within the first domain associated with the first user account, The first entity may be associated with the computing device. Resource allocation system 102 may retrieve a current quantity of resources associated with the first user account and generate, based on the current quantity of resources and the one or more event parameters, an updated quantity of resources for the first user account. Resource allocation system 102 may transmit, to the computing device, one or more instructions to update a digitally stored record associated with the first user account using the updated quantity of resources.

To illustrate, resource allocation system 102, via user analysis subsystem 116, may generate a modified resource distribution (e.g., a resource reallocation) such as Resource Distribution B (e.g., resource distribution 520) based on parameters of a resource event (e.g., resource event 202) and based on a prior resource distribution (e.g., Resource Distribution A, exemplified by resource distribution 510). For example, resource event 202 may include an event parameter (e.g., of event parameters of data structure 208) that specifies a share split-type resource event. An event parameter of the resource event may include an indication that resources (e.g., assets) associated with a particular originator (e.g., issuer) are to be split according to a ratio parameter (e.g., a 2-for-1 split, a 3-for-1 split, a 3-for 2 split, etc.). Based on determining that an event parameter specifies a ratio parameter and a split-type resource event, resource allocation system 102 may generate an updated resource distribution (e.g., Resource Distribution B or resource distribution 520) that is consistent with the parameters of the resource event (e.g., asset servicing event).

For example, user analysis subsystem 116 generates resource distribution 520 by identifying resources associated with user accounts that are associated with (e.g., modified by) the resource event. User analysis subsystem 116 may determine that Resource 2 of Resource Distribution A (e.g., with a resource value of Value 2a) is subject to a 2-for-1 split according to a resource event. As such, user analysis subsystem 116 may determine user account identifiers (e.g., of account identifiers 512) that correspond to user accounts that include Resource 2, such as User Account 1 and User Account 3 of Resource Distribution A in FIG. 5. Based on such a determination, resource allocation system 102 may generate an updated resource distribution (e.g., Resource Distribution B; resource distribution 520) that executes the requested resource event (e.g., by generating/splitting resources accordingly). For example, user analysis subsystem 116 generates a new indication of resources (e.g., digitally stored records) within resource distribution 520 (e.g., Resource 6a and/or Resource 6b), with values that reflect the share split (e.g., showing two resources that each have half the value of the original share). By doing so, resource allocation system 102 enables modifications to records associated with management/administration of resources (e.g., financial assets).

In some implementations, resource allocation system 102, via user analysis subsystem 116, may respond to election-type resource events by communicating with a user associated with a corresponding user account. For example, resource allocation system 102 determines that the resource event is an elective resource event. The elective resource event may require election from a user. User analysis subsystem 116 may modify a first resource distribution (e.g., resource distribution 510 of FIG. 5) for a first user (e.g., associated with a user account, such as User Account 1 of FIG. 5) based on a first election received from the first user. As an illustrative example, resource allocation system 102 may determine that resource event 202 of FIG. 2 includes an election-type asset servicing event, whereby an originator (e.g., an issuer) provides an option (e.g., an election) for users to acquire additional assets from the issuer (e.g., additional shares or other securities). In some implementations, an event parameter associated with the resource parameter may include a deadline for election. Resource allocation system 102, via communication subsystem 112, may transmit a message to devices associated with users of user accounts affected by an election-type resource event, thereby notifying the users of the election-type event. The message may include a deadline for response. Resource allocation system 102 may determine to assign further assets to the user account associated with the user upon receiving a message from the user (e.g., before the deadline for response) indicating approval of the election. For example, resource allocation system 102 may receive, from a first user, a first election to approve the resource event. Based on receiving the first election to approve the resource event, resource allocation system 102 may modify a first resource distribution for the first user. Resource allocation system 102 may determine not to assign further assets to the user account associated with the user upon a failure to receive a message from the user regarding the election. For example, resource allocation system 102 may, based on not receiving the first election, refrain from modifying the first resource distribution. Resource allocation system 102 may transmit an indication of an election (e.g., to approve or deny an election-type resource event) to a suitable device, such as one or more entity devices 108a-n, an originator device, and/or data storage 104 (e.g., associated with a central securities depository).

As an illustrative example, resource allocation system 102 may determine that no message has been received from a user associated with a particular user account prior to a deadline (e.g., as defined within an event parameter of the resource event). Based on the determination, resource allocation system 102 may set and/or retrieve pre-determined settings that indicate a protocol for missed deadlines. For example, the pre-determined settings may indicate that resource allocation system 102 is not to assign additional resources (e.g., additional shares) to the user upon determining that the user has not responded to the election event. Resource allocation system 102 may set resource distribution settings (e.g., for other users) to respective pre-determined settings associated with default elections (e.g., for the other users). For example, after receiving a first election from a first user to approve the resource event, resource allocation system 102 may wait to receive other elections from other users with a predetermined period of time (e.g., consistent with a deadline). Based on determining that not all elections have been received within the pre-determined period of time, resource allocation system 102 may set all elections that have not been received as disapproved. By doing so, resource allocation system 102 enables flexible, automated handling of election-type asset servicing events, thereby improving the efficiency of resource redistributions (e.g., reallocations) in response to the events.

Computing Environment

Figure 6:
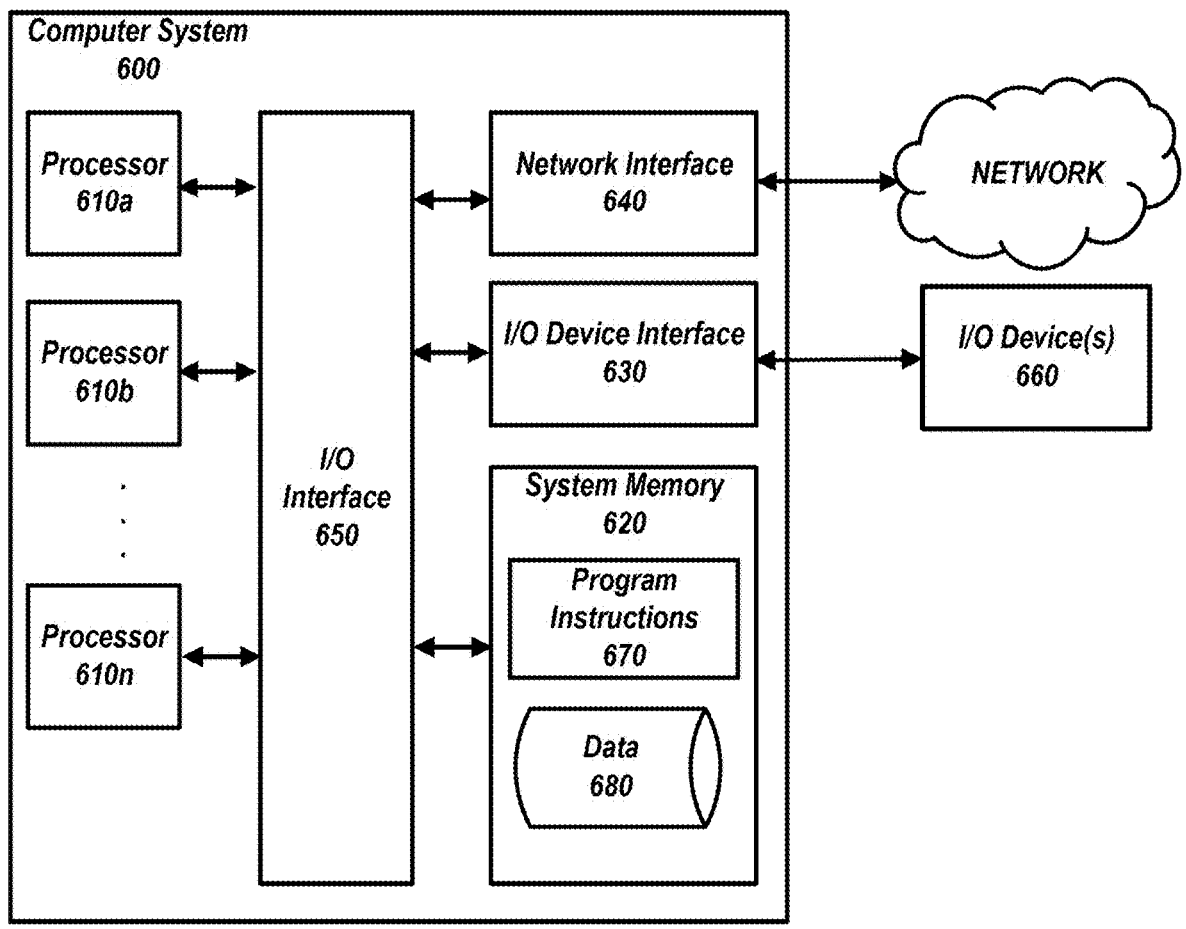
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a) or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, an LAN, a WAN, a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static RAM (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Operation Flow

Figure 7:
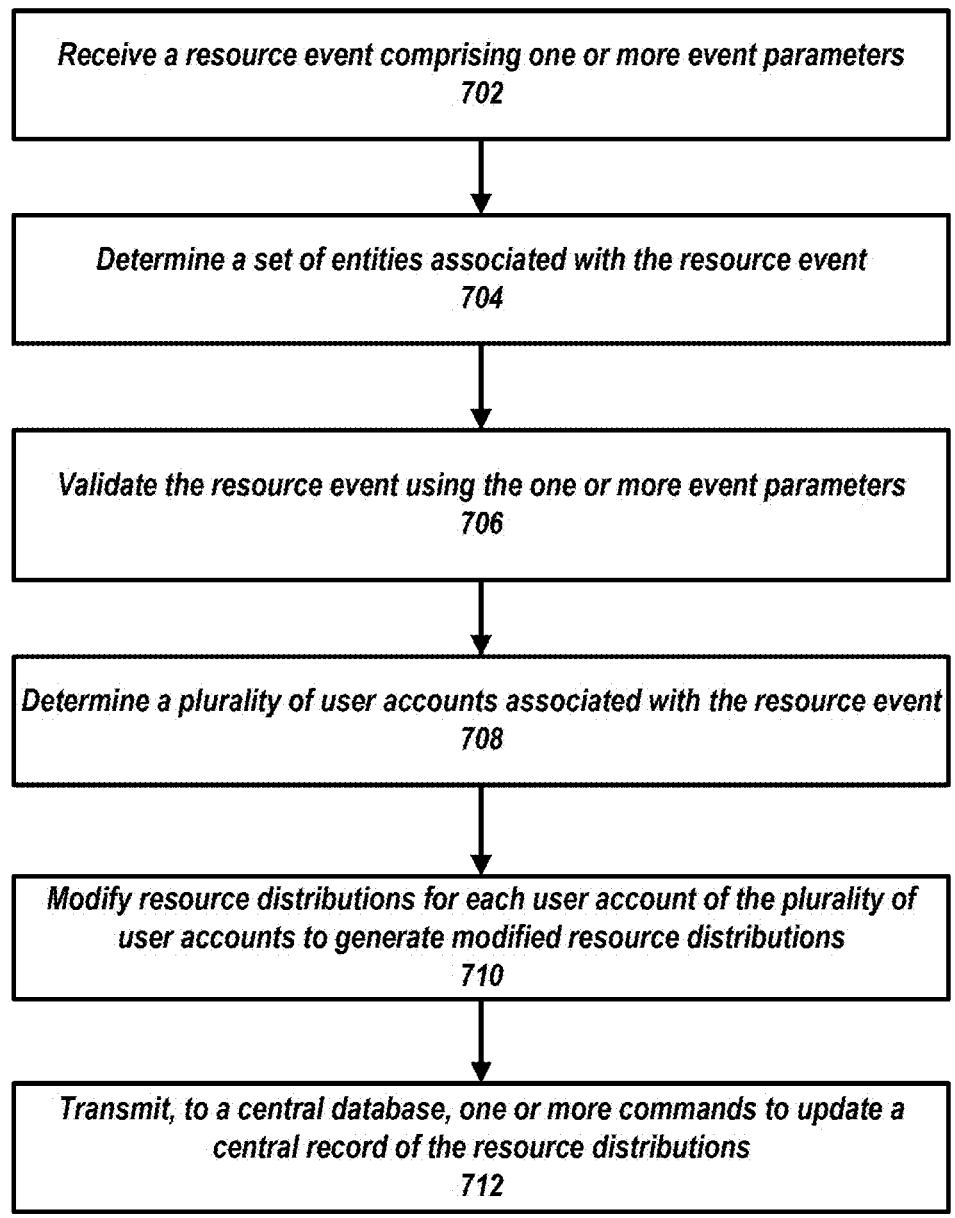
FIG. 7 is a flowchart of operations for performing database modifications based on event parameters associated with entities of different domains, in accordance with one or more embodiments of this disclosure.

FIG. 7 is a flowchart 700 of operations for performing database modifications based on event parameters associated with entities of different domains, in accordance with one or more embodiments of this disclosure. The operations of FIG. 7 may use components described in relation to FIG. 6. In some embodiments, resource allocation system 102 may include one or more components of computer system 600.

At 702, resource allocation system 102 receives a resource event comprising one or more event parameters. For example, resource allocation system 102 may receive the resource event from one or more entity devices 108*a*-108*n*, from one or more originator devices, from data storage 104 (e.g., as associated with a central securities depository), and/or from other devices communicably linked to network 150 using network interface 640 of FIG. 6. Resource allocation system 102 may store event parameters associated with the resource event within system memory 620 (e.g., as data 680).

At 704, resource allocation system 102 may determine a set of entities associated with the resource event. For example, resource allocation system 102 may access information relating to entities associated with a resource event via network interface 640 and extract relevant entities using one or more processors 610*a*-610*n* via I/O interface 650 and using program instructions 670. For example, resource allocation system 102 may store the set of entities within system memory 620 (e.g., as data 680).

At 706, resource allocation system 102 may validate the resource event using the one or more event parameters. For example, resource allocation system 102 may utilize one or more of processors 610*a*-610*n*, via I/O interface 650, to generate a validation status for the resource event (e.g., via encryption/decryption techniques and/or other program instructions 670). Resource allocation system 102 may store an indication of the validation status within system memory 620 (e.g., within data 680). In some implementations resource allocation system 102 may communicate information relating to the validation to one or more entity devices 108*a*-108*n* of FIG. 1 via network 150 and/or one or more I/O Device(s) 660.

At 708, resource allocation system 102 may determine a plurality of user accounts associated with the resource event. For example, resource allocation system 102 may receive information relating to user accounts associated with particular entities (e.g., of a particular domain) via network interface 640 and/or I/O device interface 630. Resource allocation system 102 may utilize program instructions 670 to determine user accounts (e.g., associated account identifiers) that correspond to stored event parameters (e.g., within system memory 620 and/or data 680).

At 710, resource allocation system 102 may modify resource distributions for each user account of the plurality of user accounts to generate modified resource distributions. For example, resource allocation system 102 may utilize program instructions 670 and one or more of processors 610*a*-610*n* (e.g., via I/O interface 650) to generate modified resource distributions consistent with the event parameters of the resource event (e.g., as stored in system memory 620). Resource allocation system 102 may store such information within system memory 620 (e.g., as data 680).

At 712, resource allocation system 102 may transmit one or more commands to update a central record of the resource distributions (e.g., to a central database). For example, resource allocation system 102 may generate one or more commands or messages using one or more processors 610*a*-610*n* and transmit the commands or messages to a central database via network interface 640 and/or network 150 (e.g., of FIG. 1).

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for determining database modifications based on event parameters, the method comprising: receiving, at a computing device within a first domain, a resource event, wherein the resource event comprises one or more event parameters associated with the resource event, and wherein the first domain comprises a first subset of entities; determining, based on the one or more event parameters of the resource event, a set of entities associated with the resource event, wherein the set of entities comprises the first subset of entities within the first domain and a second subset of entities within a set of different domains different from the first domain; validating the resource event using the one or more event parameters; determining, for the first subset of entities, a plurality of user accounts associated with the resource event, wherein each user account of the plurality of user accounts is assigned to a different entity within the first domain; modifying, based on the one or more event parameters associated with the resource event, resource distributions for each user account of the plurality of user accounts to generate modified resource distributions; and transmitting, to a central database, one or more commands to update a central record of the resource distributions, wherein the one or more commands comprise one or more indications of the modified resource distributions, and wherein the central database is accessible from the first domain and from the different domains.

2. A method comprising: receiving, at a computing device within a first domain, a resource event, wherein the resource event comprises one or more event parameters associated with the resource event, and wherein the first domain comprises a first subset of entities; determining, based on the one or more event parameters of the resource event, a set of entities associated with the resource event, wherein the set of entities comprises the first subset of entities within the first domain and a second subset of entities within a set of different domains different from the first domain; determining, for the first subset of entities, a plurality of user accounts associated with the resource event, wherein each user account of the plurality of user accounts is assigned to a different entity within the first domain; modifying, based on the one or more event parameters associated with the resource event, resource distributions for each user account of the plurality of user accounts to generate modified resource distributions; and transmitting, to a central database, one or more commands to update a central record of the resource distributions, wherein the one or more commands comprise one or more indications of the modified resource distributions, and wherein the central database is accessible from the first domain and from the different domains.

3. A method comprising: receiving, at a computing device within a first domain, a resource event, wherein the resource event comprises one or more event parameters associated with the resource event, and wherein the first domain comprises a first subset of entities; determining, based on the one or more event parameters of the resource event, a set of entities associated with the resource event, wherein the set of entities comprises the first subset of entities within the first domain and a second subset of entities within a set of different domains different from the first domain, and wherein each entity of the set of entities corresponds to an associated entity identifier of a set of entity identifiers; determining, for the first subset of entities, a plurality of user accounts associated with the resource event, wherein each user account of the plurality of user accounts is assigned to a different entity within the first domain; modifying, based on the one or more event parameters associated with the resource event, resource distributions for each user account of the plurality of user accounts to generate modified resource distributions; and transmitting, to a central database, one or more commands to update a central record of the resource distributions, wherein the one or more commands comprise one or more indications of the modified resource distributions, and wherein the central database is accessible from the first domain and from the different domains.

4. Any of the preceding embodiments, further comprising: identifying, for the second subset of entities of the set of different domains and based on the one or more event parameters, a plurality of domains and associated resource distributions; determining, for each domain of the plurality of domains, a corresponding distribution of resources; and generating, for each domain of the plurality of domains, a message that instructs each domain to modify corresponding database records for corresponding user accounts within each domain based on the associated resource distributions.

5. Any of the preceding embodiments, wherein determining the set of entities associated with the resource event comprises: retrieving, from the central database using an originator parameter of the one or more event parameters, a plurality of entities that manage resources for an originator; and determining, based on the plurality of entities and the one or more event parameters, the set of entities, wherein each database entry within the central database is tagged with an originator identifier associated with the originator.

6. Any of the preceding embodiments, wherein determining, for the first subset of entities, the plurality of user accounts associated with the resource event comprises: retrieving a corresponding entity identifier associated with each entity within the set of entities; comparing each corresponding entity identifier with entity identifiers within an entity list associated with the first domain; and determining the first subset of entities based on any matching entity identifiers within the entity list associated with the first domain.

7. Any of the preceding embodiments, wherein modifying the resource distributions for each user account of the plurality of user accounts to generate the modified resource distributions comprises: selecting a first user account of the plurality of user accounts; determining a first entity within the first a second domain associated with the first user account, wherein the first entity is associated with the computing device, and wherein the second domain is different from the first domain; retrieving a current quantity of resources associated with the first user account; generating, based on the current quantity of resources and the one or more event parameters, an updated quantity of resources for the first user account; and transmitting, to the computing device, one or more instructions to update a digitally stored record associated with the first user account using the updated quantity of resources.

8. Any of the preceding embodiments, further comprising: determining that the resource event is an elective resource event, wherein the elective resource event requires an election from a user; and modifying a first resource distribution for a first user based on a first election received from the first user.

9. Any of the preceding embodiments, further comprising setting resource distribution settings, for other users, to respective pre-determined settings associated with default elections for the other users.

10. A tangible, non-transitory, machine-readable medium storing instructions that, when executed by a data processing apparatus, cause the data processing apparatus to perform operations comprising those of any of embodiments 1-9.

11. A system comprising: one or more processors; and memory storing instructions that, when executed by the processors, cause the processors to effectuate operations comprising those of any of embodiments 1-9.

12. A system comprising means for performing any of embodiments 1-9.

13. A system comprising cloud-based circuitry for performing any of embodiments 1-9.

What is claimed is:

1. A system for performing database modifications based on event parameters, the system comprising:
   one or more processors; and
   one or more memory devices configured to store instructions that when executed by the one or more processors perform operations comprising:
   receiving, at a computing device within a first domain of entities, a resource event from a central database separate from the first domain of entities, wherein the resource event comprises one or more event parameters associated with the resource event, the one or more event parameters comprising a reallocation parameter that indicates one or more reallocation values for a plurality of user accounts, and wherein the first domain of entities comprises a first subset of entities;
   determining, based on the one or more event parameters of the resource event received from the central database, a set of entities associated with the resource event, wherein the set of entities comprises the first subset of entities and a second subset of entities, the second subset of entities being within a set of different domains of entities different from the first domain of entities and separate from the central database;
   validating the resource event using the one or more event parameters;
   determining, for the first subset of entities based on the one or more event parameters received from the central database, the plurality of user accounts associated with the resource event, wherein each user account of the plurality of user accounts is assigned to a different entity within the first domain of entities;
   selecting a first user account of the plurality of user accounts;
   determining a first entity within the first domain associated with the first user account;
   accessing a current quantity of resources associated with the first user account;
   generating, based on the one or more event parameters, an updated quantity of resources for the first user account;
   modifying, based on the one or more event parameters associated with the resource event, resource distributions for the plurality of user accounts to add one or more entries representing one or more resources to each user account of the plurality of user accounts, wherein modifying the resource distributions comprises transmitting, to the computing device, one or more instructions to update a digitally stored record associated with the first user account using the updated quantity of resources; and
   transmitting, to the central database, one or more commands to update a central record of the resource distributions, wherein the one or more commands comprise one or more indications of the one or more entries added to the plurality of user accounts, and wherein the central database is accessible from the first domain of entities and from the set of different domains of entities.

2. The system of claim 1, wherein the instructions further cause the one or more processors to perform operations comprising:
   identifying, for the second subset of entities of the set of different domains and based on the one or more event parameters, a plurality of domains and associated resource distributions;
   determining, for each domain of the plurality of domains, a corresponding distribution of resources; and
   generating, for each domain of the plurality of domains, a message that instructs each domain to modify corresponding database records for corresponding user accounts within each domain based on the associated resource distributions.

3. The system of claim 1, wherein the instructions for determining the set of entities associated with the resource event comprises:
   retrieving, from the central database using an originator parameter of the one or more event parameters, a plurality of entities that manage resources for an originator; and
   determining, based on the plurality of entities and the one or more event parameters, the set of entities, wherein each database entry within the central database is tagged with an originator identifier associated with the originator.

4. The system of claim 1, wherein the instructions for determining, for the first subset of entities, the plurality of user accounts associated with the resource event further cause the one or more processors to perform operations comprising:
   retrieving a corresponding entity identifier associated with each entity within the set of entities;
   comparing each corresponding entity identifier with entity identifiers within an entity list associated with the first domain; and
   determining the first subset of entities based on any matching entity identifiers within the entity list associated with the first domain.

5. The system of claim 1, wherein the instructions further cause the one or more processors to perform operations comprising:
   determining that the resource event is an elective resource event, wherein the elective resource event requires an election from a user; and
   modifying a first resource distribution for a first user based on a first election received from the first user.

6. The system of claim 5, wherein the instructions further cause the one or more processors to perform operations comprising setting resource distribution settings, for other users, to respective pre-determined settings associated with default elections for the other users.

7. A method comprising:
   receiving, at a computing device within a first domain of entities, a resource event from a central database separate from the first domain of entities, wherein the resource event comprises one or more event parameters associated with the resource event, the one or more event parameters comprising a reallocation parameter that indicates one or more reallocation values for a plurality of user accounts, and wherein the first domain of entities comprises a first subset of entities;
   determining, based on the one or more event parameters of the resource event received from the central database, a set of entities associated with the resource event, wherein the set of entities comprises the first subset of entities and a second subset of entities, the second subset of entities being within a set of different domains of entities different from the first domain of entities and separate from the central database;

determining, for the first subset of entities based on the one or more event parameters received from the central database, the plurality of user accounts associated with the resource event, wherein each user account of the plurality of user accounts is assigned to a different entity within the first domain of entities;

selecting a first user account of the plurality of user accounts;

determining a first entity within the first domain associated with the first user account, wherein the first entity is associated with the computing device;

accessing a current quantity of resources associated with the first user account;

generating, based on the current quantity of resources and the one or more event parameters, an updated quantity of resources for the first user account;

modifying, based on the one or more event parameters associated with the resource event, resource distributions for the plurality of user accounts to add one or more entries representing one or more resources to each user account of the plurality of user accounts, wherein modifying the resource distributions comprises transmitting, to the computing device, one or more instructions to update a record associated with the first user account using the updated quantity of resources; and transmitting, to the central database, one or more commands to update a central record of the resource distributions, wherein the one or more commands comprise one or more indications of the one or more entries added to the plurality of user accounts, and wherein the central database is accessible from the first domain of entities and from the set of different domains of entities.

8. The method of claim 7, further comprising:
identifying, for the second subset of entities of the set of different domains and based on the one or more event parameters, a plurality of domains and associated resource distributions;

determining, for each domain of the plurality of domains, a corresponding distribution of resources; and generating, for each domain of the plurality of domains, a message that instructs each domain to modify corresponding database records for corresponding user accounts within each domain based on the associated resource distributions.

9. The method of claim 7, wherein determining the set of entities associated with the resource event comprises:
retrieving, from the central database using an originator parameter of the one or more event parameters, a plurality of entities that manage resources for an originator; and determining, based on the plurality of entities and the one or more event parameters, the set of entities, wherein each database entry within the central database is tagged with an originator identifier associated with the originator.

10. The method of claim 7, wherein determining, for the first subset of entities, the plurality of user accounts associated with the resource event comprises:
retrieving a corresponding entity identifier associated with each entity within the set of entities;

comparing each corresponding entity identifier with entity identifiers within an entity list associated with the first domain; and determining the first subset of entities based on any matching entity identifiers within the entity list associated with the first domain.

11. The method of claim 7, further comprising:

determining that the resource event is an elective resource event, wherein the elective resource event requires an election from a user;

receiving, from a first user, a first election to approve the resource event;

based on receiving the first election to approve the resource event, modifying a first resource distribution for the first user; and based on not receiving the first election, refraining from modifying the first resource distribution.

12. The method of claim 7, further comprising:
after receiving the first election to approve the resource event, waiting to receive other elections from other users with a predetermined period of time; and based on determining that not all elections have been received within the predetermined period of time, setting all elections that have not been received as disapproved.

13. Non-transitory, computer-readable media configured to store instructions that, when executed by one or more processors, cause the one or more processors to perform operations comprising:
receiving, at a computing device within a first domain of entities, a resource event from a central database separate from the first domain of entities, wherein the resource event comprises one or more event parameters associated with the resource event, the one or more event parameters comprising a reallocation parameter that indicates one or more reallocation values for a plurality of user accounts and wherein the first domain of entities comprises a first subset of entities;

determining, based on the one or more event parameters of the resource event received from the central database, a set of entities associated with the resource event, wherein the set of entities comprises the first subset of entities and a second subset of entities, the second subset of entities being within a set of different domains of entities different from the first domain of entities and separate from the central database, and wherein each entity of the set of entities corresponds to an associated entity identifier of a set of entity identifiers;

determining, for the first subset of entities based on the one or more event parameters received from the central database, the plurality of user accounts associated with the resource event, wherein each user account of the plurality of user accounts is assigned to a different entity within the first domain of entities;

selecting a first user account of the plurality of user accounts;

determining a first entity within the first domain associated with the first user account, wherein the first entity is associated with the computing device;

accessing a current quantity of resources associated with the first user account;

generating, based on the current quantity of resources and the one or more event parameters, an updated quantity of resources for the first user account;

modifying, based on the one or more event parameters associated with the resource event, resource distributions for the plurality of user accounts to add one or more entries representing one or more resources to each user account of the plurality of user accounts, wherein modifying the resource distributions comprises transmitting, to the computing device, one or more instructions to update a record associated with the first user account using the updated quantity of resources; and transmitting, to the central database, one or more commands to update a central record of the resource distributions, wherein the one or more commands comprise one or more indications of the one or more entries added to the plurality of user accounts, and wherein the central database is accessible from the first domain of entities and from the set of different domains of entities.

14. The non-transitory, computer-readable media of claim 13, wherein the instructions cause the one or more processors to perform operations further comprising:
identifying, for the second subset of entities of the set of different domains and based on the one or more event parameters, a plurality of domains and associated resource distributions;
determining, for each domain of the plurality of domains, a corresponding distribution of resources; and
generating, for each domain of the plurality of domains, a message that instructs each domain to modify corresponding database records for corresponding user accounts within each domain based on the associated resource distributions.

15. The non-transitory, computer-readable media of claim 13, wherein the instructions for determining the set of entities associated with the resource event cause the one or more processors to perform operations comprising:
retrieving, from the central database using an originator parameter of the one or more event parameters, a plurality of entities that manage resources for an originator; and
determining, based on the plurality of entities and the one or more event parameters, the set of entities, wherein each database entry within the central database is tagged with an originator identifier associated with the originator.

16. The non-transitory, computer-readable media of claim 13, wherein the instructions for determining, for the first subset of entities, the plurality of user accounts associated with the resource event cause the one or more processors to perform operations comprising:
retrieving a corresponding entity identifier associated with each entity within the set of entities;
comparing each corresponding entity identifier with entity identifiers within an entity list associated with the first domain; and
determining the first subset of entities based on any matching entity identifiers within the entity list associated with the first domain.

17. The non-transitory, computer-readable media of claim 13, wherein the instructions cause the one or more processors to perform operations further comprising:
determining that the resource event is an elective resource event, wherein the elective resource event requires an election from a user; and
modifying a first resource distribution for the user based on a first election received from a first user.

* * * * *